United States Patent [19]

Hisanaga

[11] Patent Number: 5,072,614

[45] Date of Patent: Dec. 17, 1991

[54] TEMPERATURE COMPENSATING CIRCUIT

[75] Inventor: Tetsuo Hisanaga, Yokohama, Japan

[73] Assignee: Yamatake-Honeywell Co., Ltd., Tokyo, Japan

[21] Appl. No.: 478,611

[22] Filed: Feb. 12, 1990

[30] Foreign Application Priority Data

Mar. 10, 1989 [JP] Japan .................................. 1-59266

[51] Int. Cl.[5] ................................................ G01F 1/68
[52] U.S. Cl. ................................ 73/204.19; 73/204.26
[58] Field of Search ............ 73/204.15, 204.16, 204.17, 73/204.18, 204.19, 204.25, 204.26

[56] References Cited

U.S. PATENT DOCUMENTS

| 3,085,431 | 4/1963 | Yerman et al. | 73/204.19 X |
|---|---|---|---|
| 3,891,391 | 6/1975 | Boone | 73/204.19 X |
| 4,206,638 | 6/1980 | Djorup | 73/204.17 X |
| 4,343,183 | 8/1982 | Plapp | 73/204.15 |
| 4,566,320 | 1/1986 | Bohrer | 73/204.16 |

Primary Examiner—Herbert Goldstein
Attorney, Agent, or Firm—Whitham & Marhoefer

[57] ABSTRACT

A temperature compensating circuit having a third temperature sensor element for detecting an ambient temperature disposed on the same substrate on which first and second temperature sensor elements are located, and a voltage across the third sensor element, generated by supplying a current thereto, is applied to the first and second sensor elements. Therefore, a voltage applied to first and second sensor elements is automatically changed corresponding to change in ambient temperature, and accordingly a difference in temperature between first and second sensor elements can be precisely detected in a form of voltage signal.

3 Claims, 4 Drawing Sheets

TEMPERATURE COMPENSATING CIRCUIT

BACKGROUND OF THE INVENTION

1. Field of the Invention

This invention relates to a temperature compensating circuit, and more particularly to a circuit of this kind suitable in use for a flow sensor which is adapted to e.g. measure a temperature difference between two points on a chip and detect a flow quantity from the result of such measurement.

2. Description of the Prior Art

FIG. 1 is a perspective view of a flow sensor of a type known as a microbridge flow sensor. The flow sensor as illustrated comprises a pair of temperature sensing elements or resistive elements $R_X$, $R_Y$, a heater element H and a base 10 supporting sensor elements $R_X$, $R_Y$ and heater element H. Base 10 is provided with a depression 20 formed on the upper surface thereof, as shown in FIG. 1, such that the elements $R_X$, $R_Y$, H are bridged thereacross. An arrow in the drawing indicates the direction of a flow.

The heater element is heated to a relatively low temperature, e.g., at 60° C. Also, sensor elements are thermally isolated from heater element so that a temperature at element RX on the upstream side of heater element is substantially equal to an ambient temperature $T_A$ °C.

FIGS. 2-4 respectively show a conventional temperature compensating circuit including temperature sensor elements such as resistive elements $R_X$, $R_Y$ shown in FIG. 1. In FIG. 2, resistive elements $R_X$, $R_Y$ are serially coupled to constant current sources 1, 2, respectively, at points P1, P2, to form a bridge circuit. Differential amplifier 3 has its input terminals coupled to connecting points P1, P2 to receive a voltage signal Vz (=I(RX−RY)), where I represents a current flowing through the bridge circuit.

FIG. 3 shows a more simplified equivalent circuit which employs resistive elements R1, R2 in place of constant current sources 1, 2. If $R_1$, $R_2 >> R_X$, $R_Y$ is satisfied, current I shows a substantially constant value, so that the circuit of FIG. 3 operates similarly to that of FIG. 2.

FIG. 4 is another simplified circuit in which resistive elements $R_X$, $R_Y$ are connected in series and output Vz is extracted from connecting point P3 between them. Thus, output Vz is expressed by $Vz = V(R_X/(R_X+R_Y))$. Resistive element $R_X$, $R_Y$ are assumed to have a resistance-temperature characteristic as shown in FIG. 5. If a resistance value at 0° C. is $R_{X0}$, a resistance value $R_X$ at a temperature T is expressed by $R_X = R_{X0}(1+\alpha T)$. Also, a resistance value $R_Y$ at a temperature T is expressed, in the same manner, by $R_Y = R_{Y0}(1+\alpha T)$.

As described above, a temperature at resistive element $R_X$ at the upstream side is substantially equal to an ambient temperature $T_A$ °C. because of a highly insulating material employed to insulate resistive element $R_X$ from the heater element. Therefore, if a difference in temperature values sensed by resistive elements $R_X$, $R_Y$ is $\Delta T_D$, a temperature of resistive element RY at the downstream side of heater element H is expressed by $T_A + \Delta T_D$ °C.

Under the condition as described above, output Vz supplied from the bridge circuit of FIG. 1 to differential amplifier 3 is expressed as follows:

$$V_z = I(R_X - R_Y) \quad (1)$$
$$= I[R_{X0}\{1 + \alpha(T_A + \Delta T_D)\} - R_{Y0}(1 + \alpha T_A)]$$
$$= I\{R_{X0} - R_{Y0} + \alpha(R_{X0} - R_{Y0})T_A + \alpha R_{X0}\Delta T_D\}$$

If $\Delta T_D$ is assumed to be zero, in order to see a zero point fluctuation characteristic of output Vz, expression (1) is transformed to the following expression (2):

$$V_z = I\{R_{X0} - R_{Y0} + \alpha(R_{X0} - R_{Y0})T_A\} \quad (2)$$

Further assuming that $R_{X0}$ is equal to $R_{Y0}$, Vz is zero. However, when $R_{X0}$ is not equal to $R_{Y0}$, e.g., due to variations in a manufacturing process, output Vz is determined by expression (2) and accordingly dependent on an ambient temperature $T_A$.

In FIG. 3, if $R_1$, $R_2 >> R_X$, $R_Y$ stands, the same relationship as the circuit as shown in FIG. 2 is established.

In the circuit shown in FIG. 4, output Vz is expressed by the following expression:

$$V_z = V \frac{R_{X0}\{1 + (\alpha(T_A + T_D)\}}{R_{X0}\{1 + \alpha(T_A + \Delta T_D)\} + R_{Y0}(1 + \alpha T_A)} \quad (3)$$

If $\Delta T_D$ is zero, that is, if there is no flow, expression (3) is transformed to the following expression (4):

$$V_z = V \frac{R_{X0}}{R_{X0} + R_{Y0}} \quad (4)$$

It can be seen from expression (4) that even if $R_{X0}$ is not equal to $R_{Y0}$, due to variations in production, voltage signal Vz is not influenced by ambient temperature $T_A$ since voltage Vz is calculated only by a ratio of resistance values $R_{X0}$, $R_{Y0}$. However, it is generally difficult to make $R_{X0}$, $R_{Y0}$ equal to each other, the circuit arrangement of FIG. 4 is more practical than that of FIG. 2.

Thus, in FIG. 4, voltage signal Vz at a reference point where temperature difference $\Delta T_D$ between sensor elements $R_X$, $R_Y$ is zero is expressed as (3) minus (4):

$$Vz' = V \frac{R_{X0}\{1 + (\alpha(T_A + T_D)\}}{R_{X0}\{1 + \alpha(T_A + \Delta T_D)\} + R_{Y0}(1 + \alpha T_A)} - \quad (5)$$
$$V \frac{R_{X0}}{R_{X0} + R_{Y0}}$$
$$= \frac{R_{X0}R_{Y0}\alpha\Delta T_D}{\{(R_{X0} + R_{Y0})(1 + \alpha T_A) + R_{X0}\alpha\Delta T_D\}(R_{X0} + R_{Y0})}$$

If change in $\Delta T_D$ is small and if $1 + \alpha T_A >> \alpha \Delta T_D$ stands, Vz' is expressed by the following approximation (6):

$$Vz' \approx V \frac{R_{X0}R_{Y0}\alpha\Delta T_D}{(R_{X0} + R_{Y0})^2(1 + \alpha T_A)} \quad (6)$$

As is apparent from approximation (6), voltage signal Vz is influenced by ambient temperature $T_A$ such that, when α is a positive value, voltage signal Vz becomes smaller as ambient temperature $T_A$ is higher.

To reduce such influence of the ambient temperature, diode D whose forward voltage has a negative temperature coefficient may be connected in series with sensor element $R_Y$, as shown in FIG. 6.

However, it is quite difficult to match the temperature coefficient of diode D with those of temperature sensor elements $R_X$, $R_Y$. Also, temperature compensation is not precisely achieved e.g. by variations in forward voltage of diode D and difference in temperature between diode D and temperature sensor elements $R_X$, $R_Y$ which may occur if they are located separately.

OBJECTS AND SUMMARY OF THE INVENTION

In view of the problem as mentioned above, it is an object of the present invention to provide a temperature compensating circuit which is capable of eliminating influences of ambient temperature and producing a precise voltage signal indicative of a difference in temperature between two temperature sensor elements provided on a semiconductor substrate.

To achieve the above object, the present invention provides a temperature compensating circuit comprising:

(a) first and second temperature sensitive elements serially connected with each other on a semiconductor substrate for extracting an output from a connecting point therebetween; and (b) voltage source means comprising a third temperature sensitive element on the semiconductor substrate for applying an end of said serially connected first and second temperature sensitive elements with a voltage for temperature compensation.

The above and other objects and features of the present invention will become apparent from the following detailed description of the preferred embodiments with reference to the accompanying drawings.

DETAILED DESCRIPTION OF THE PREFERRED EMBODIMENTS

Figure 1:
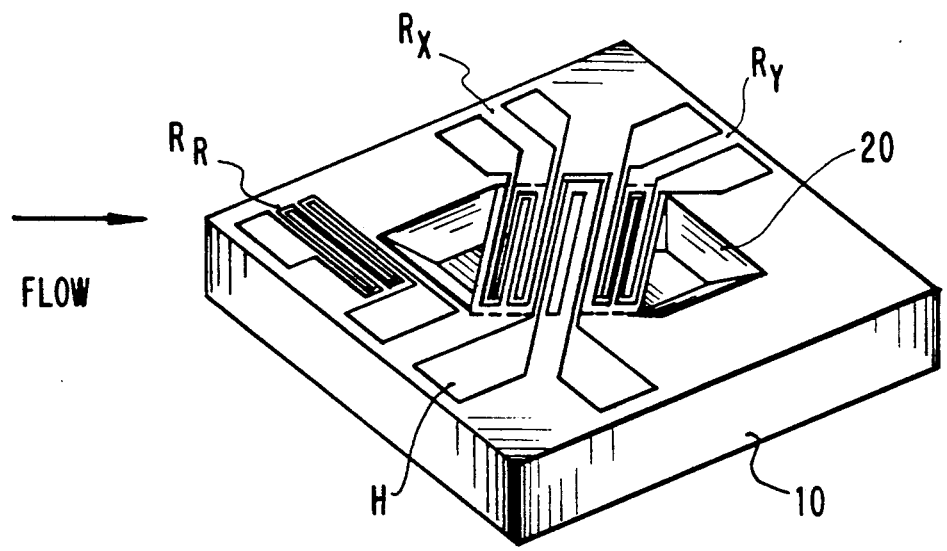
FIG. 1 is a perspective view showing an appearance of a flow sensor.
Figure 2:
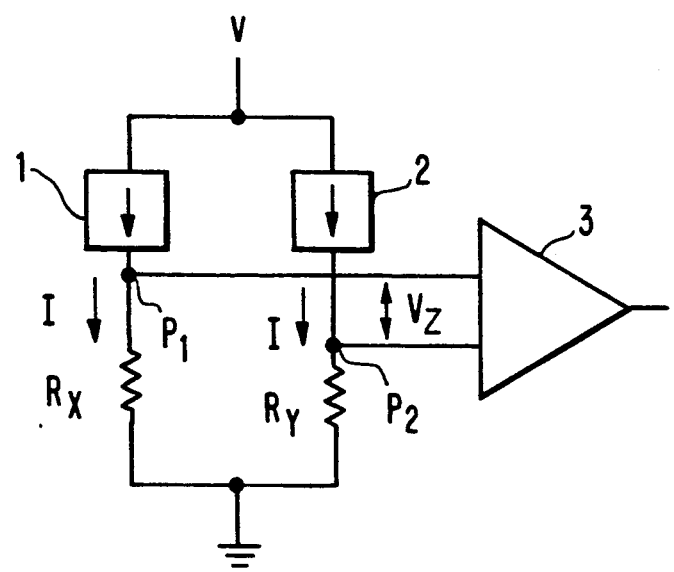
FIGS. 2, 3 and 4 are schematic circuit diagrams respectively showing a prior art temperature compensating circuit.
Figure 3:
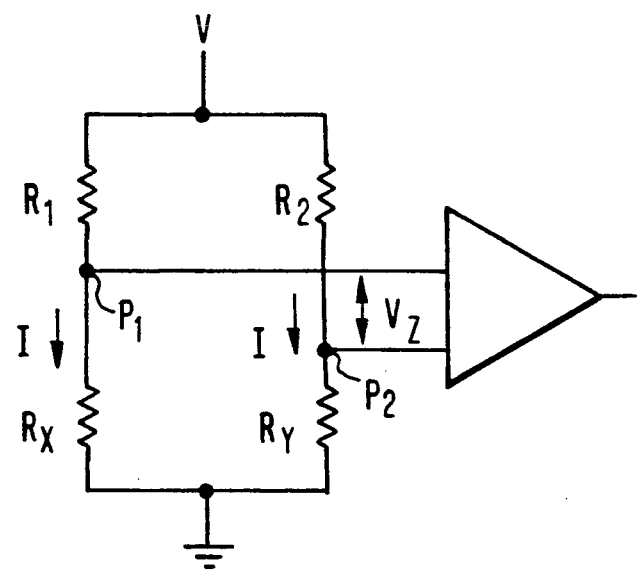
Figure 4:
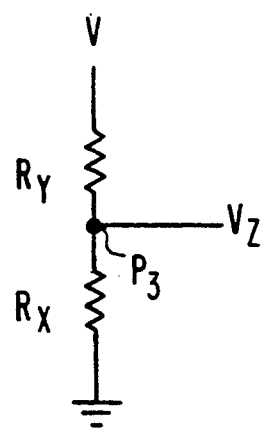
Figure 5:
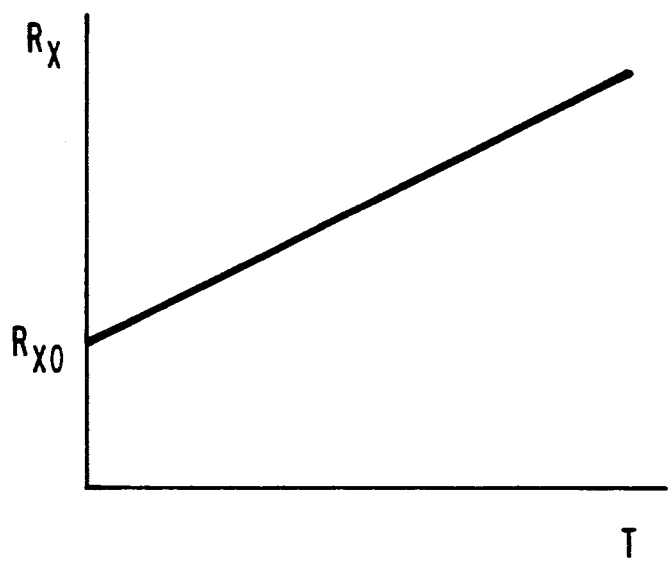
FIG. 5 is a graph showing a resistance-temperature characteristic of a temperature sensor element.
Figure 6:
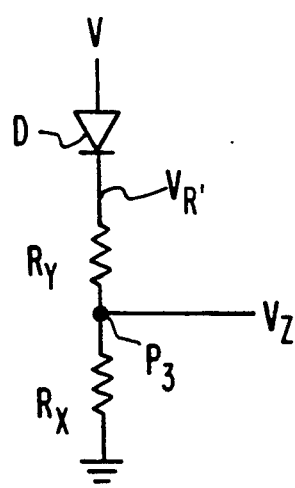
FIG. 6 is a schematic circuit diagram showing a prior art temperature compensating circuit employing a diode.
Figure 7:
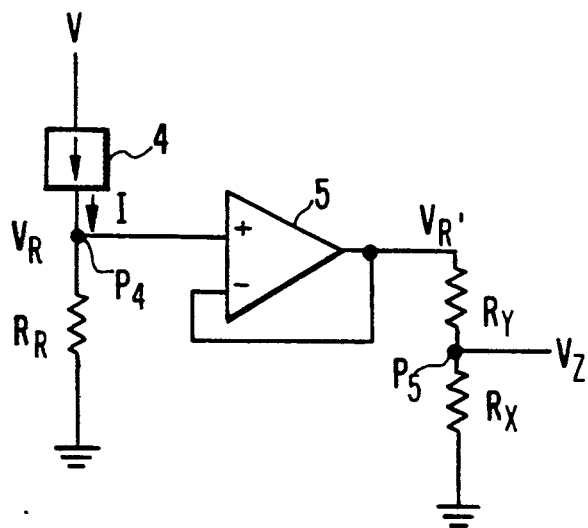
FIGS. 7, 8 and 9 are schematic circuit diagrams respectively showing first, second and third embodiments of the present invention.

A first embodiment of the present invention will now be described with reference to FIG. 7. In FIG. 7, like parts corresponding to those in FIGS. 2-4 are designated the same reference numerals and detailed explanation thereof will be omitted.

In a temperature compensating circuit of FIG. 7, third temperature sensor element $R_R$ is disposed on the same substrate as sensor elements $R_X$, $R_Y$. Constant current source 4 is coupled in series to third temperature sensor element $R_R$ to supply the circuit with constant current I. Amplifier 5 is has its non-inverting input terminal coupled to a connecting point $P_4$ between source I and sensor element $R_R$ to be supplied with voltage $V_R$ and its output terminal coupled to an end of serially connected sensor elements $R_X$, $R_Y$ to thereby form a voltage follower circuit.

A voltage $V_R$ across sensor element $R_R$ is amplified by voltage follower circuit 5 to produce a voltage $V_R'$ which in turn is applied to temperature sensor elements $R_X$, $R_Y$, and consequently a voltage $V_Z$ is extracted from connecting point $P_5$ between resistive elements $R_X$, $R_Y$.

Voltage $V_R'$ derived from amplifier 5 is expressed by the following expression (7):

$$V_R' = V_R = IR_R = IR_{R0}(1 + \alpha T_A) \tag{7}$$

From this expression (7) and the foregoing expression (6), $V_Z$ is expressed as follows:

$$\begin{aligned} V_{z'} &= \frac{V_R' R_{X0} R_{Y0} \alpha \Delta T}{(R_{X0} + R_{Y0})^2 (1 + \alpha T_A)} \\ &= \frac{IR_{R0}(1 + \alpha T_A) R_{X0} R_{Y0} \alpha \Delta T}{(R_{X0} + R_{Y0})^2 (1 + \alpha T_A)} \\ &= \frac{IR_{R0} R_{X0} R_{Y0} \alpha \Delta T}{(R_{X0} + R_{Y0})^2} \end{aligned} \tag{8}$$

It will be understood from expression (8) that voltage $V_Z$ will not be influenced by ambient temperature $T_A$. Further, a current $I_{XY}$ flowing sensor elements $R_X$, $R_Y$ is expressed by the following expression (9):

$$I_{XY} = \frac{V_R'}{R_X + R_Y} = \frac{IR_R}{R_X + R_Y} \tag{9}$$

If the thickness of these elements varies by a ratio d with respect to a reference thickness, current $I_{XY'}$ through the sensor elements $R_X$, $R_Y$ is:

$$I_{XY'} = \frac{IR_R(1 + d)}{R_X(1 + d) + R_Y(1 + d)} = \frac{IR_R}{R_X + R_Y} \tag{9'}$$

As is apparent from the expression (9)', current $I_{XY'}$ is equal to current $I_{XY}$, that is, the circuit is free from the influence of variation d in thickness which may occur in a manufacturing process.

As described above, since third temperature sensor element $R_R$ is disposed on the same substrate surface as first and second sensor elements $R_X$, $R_Y$, a difference in temperature at the locations of sensor elements RR, RX is not present so that an error in temperature compensation can be largely reduced. Also, current through the sensor elements $R_X$, $R_Y$ can be always maintained substantially constant even if these elements respectively have a different resistance value from each other.

Figure 8:
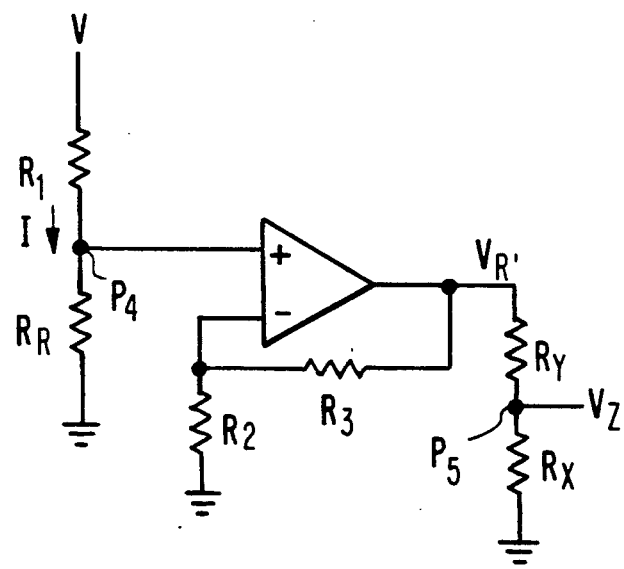

FIG. 8 shows a second embodiment of the present invention where constant current source 4 in FIG. 7 is replaced by resistor $R_1$ and feedback resistor $R_2$, $R_3$ are connected to voltage follower circuit 5.

Thus, output voltage $V_R'$ from voltage follower circuit 5 is expressed by:

$$V_R' = V \frac{R_R \cdot R_3}{R_1 \cdot R_2} \tag{10}$$

In this expression, if it is assumed that $R_1 \gg R_R$ stands, current I through third sensor element $R_R$ is substantially constant, thereby making it possible to readily perform the same function as the embodiment shown in FIG. 7.

Figure 9:
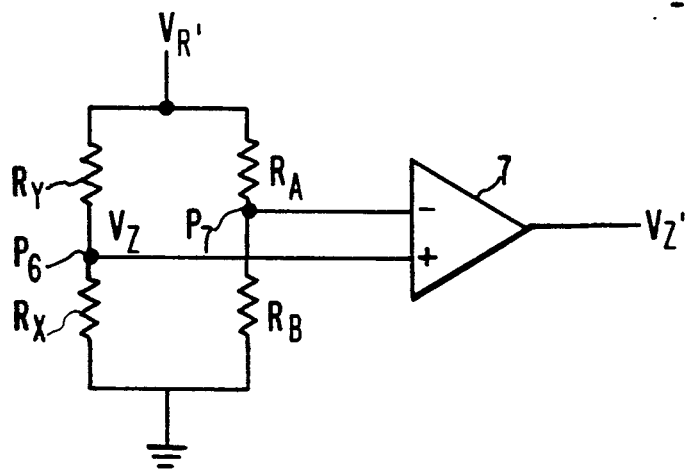

FIG. 9 shows an arrangement for producing output $V_Z$ based on output voltage $V_R'$ of voltage follower circuit 5. Serially connected resistors $R_A$, $R_B$ are connected to serially connected first and second temperature sensor elements $R_X$, $R_Y$ to form a bridge circuit. Then, the inverting terminal of differential amplifier 7 is connected to a connecting point $P_6$ between resistors $R_A$, $R_B$ while the non-inverting terminal of the same is connected to a connecting point $P_7$ between sensor resistive elements $R_X$, $R_Y$. In this arrangement, resistors RA, RB are selected so as to establish $R_Y \cdot R_B = R_X \cdot R_A$ when temperature difference $\Delta T_D$ between sensor elements $R_X$, $R_Y$ is zero.

As described above, the temperature compensating circuit according to the present invention has a third temperature sensor element for detecting an ambient temperature disposed on the same substrate on which first and second temperature sensor elements are located, and a voltage across the third sensor element, generated by supplying a current thereto, is applied to the first and second sensor elements. Therefore, a voltage applied to first and second sensor elements is automatically changed corresponding to change in ambient temperature, and accordingly a difference in temperature between first and second sensor elements can be precisely detected in a form of voltage signal.

It will be understood that those skilled in the art may make changes and modifications to the foregoing temperature compensating circuit without departing from the spirit and scope of the invention as set forth in the claims appended hereto.

What is claimed is:

1. In a microbridge fluid flow sensor in which first and second temperature responsive elements are formed on a semiconductor substrate adjacent a heating element and are arranged so that fluid flow causes a differential heating of one of said elements relative to the other, a circuit for measuring said flow comprising in combination:

means connecting said first and second temperature responsive elements in series with one end respectively of each said first and second elements connected to a common electrical point and means for connecting said common point to a circuit for indicating fluid flow as a function of the voltage at said point; and constant current means establishing a current through said first and second elements in series at a voltage that is a function of the ambient temperature of said fluid.

2. In a microbridge fluid flow sensor in which first and second temperature responsive elements are formed on a semiconductor substrate adjacent a heating element and are arranged so that fluid flow causes a differential heating of one of said elements relative to the other, a circuit for measuring said flow comprising in combination:

means connecting said first and second temperature responsive elements in series with one end respectively of each said first and second elements connected to a common electrical point and means for connecting said common point circuit for indicating fluid flow as a function of the voltage at said point;

a third temperature responsive element formed on said semiconductor substrate;

constant current means including said third temperature responsive element for establishing a current through said first and second elements in series at a voltage that is a function of the ambient temperature of said fluid.

3. In a microbridge fluid flow sensor in which first and second temperature responsive elements are formed on a semiconductor substrate adjacent a heating element and are arranged so that fluid flow causes a differential heating of one of said temperature response elements relative to the other, a circuit for measuring said flow comprising in combination:

means connecting said first and second temperature responsive elements in series with one end respectively of each said first and second elements connected to a common electrical point and means for connecting said common point to a circuit for indicating fluid flow as a function of the voltage at said point;

a third temperature responsive element formed on said semiconductor substrate;

a means for providing a constant current coupled to said third temperature responsive element for establishing a voltage drop across said element that is a function of the ambient temperature of said fluid;

amplifier means having an input and a high impedance output;

means for coupling the voltage drop across said third element to the input of said amplifier means;

means for coupling the high impedance output of said amplifier means to said first and second elements coupled in series;

said amplifier means establishing a current through said first and second elements connected in series at a voltage that is a function of the voltage drop across third element.

* * * * *